Figure 1:
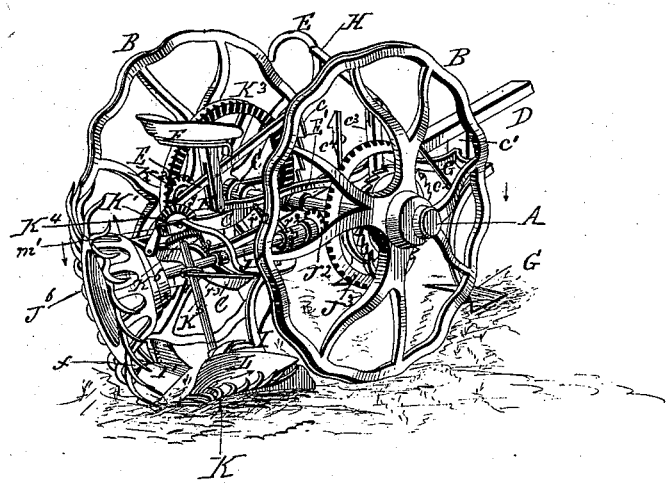

(No Model.) 2 Sheets—Sheet 1.

E. T. FORD.
POTATO DIGGER.

No. 412,491. Patented Oct. 8, 1889.

Witnesses
Frank Coleman
Edward S. Fenwick

Inventor
Elias T. Ford
By his Attorneys
Mason, Fenwick and Lawrence (No Model.) 2 Sheets—Sheet 2.

E. T. FORD.
POTATO DIGGER.

No. 412,491. Patented Oct. 8, 1889.

Witnesses
J. Frank Coleman
Edward J. Fenwick

Inventor
Elias T. Ford
By his Attorneys
Mason, Fenwick and Lawrence

UNITED STATES PATENT OFFICE.

ELIAS T. FORD, OF STILLWATER, NEW YORK.

POTATO-DIGGER.

SPECIFICATION forming part of Letters Patent No. 412,491, dated October 8, 1889.

Application filed February 24, 1883. Serial No. 86,201. (No model.)

*To all whom it may concern:*

Be it known that I, ELIAS T. FORD, a citizen of the United States, residing at Stillwater, in the county of Saratoga and State of New York, have invented certain new and useful Improvements in Potato-Digging Machines; and I do hereby declare the following to be a full, clear, and exact description of the invention, such as will enable others skilled in the art to which it appertains to make and use the same.

My invention consists in certain constructions, combinations, and arrangements of parts in a potato-digger, as will be hereinafter described and specifically claimed; and its objects are, first, to provide for driving a rotary digging-wheel with a diagonal inclined shaft from one side of the draft-frame, and a rotary conveyer separator-wheel by a similar shaft from the other side of said frame through the supporting traction-wheels, and thereby equalize the strain upon the axle of the machine; second, to provide a concavo-convex rotary conveyer separator-wheel, either solid or tined; third, to provide a directing and discharging shield in connection with the concave rotary conveyer separator-wheel; fourth, to provide a concave outwardly and forwardly flared rotary digging-wheel having a continuous cutting-edge; fifth, to provide a concave continuous edged digging-wheel having arms formed of curved spaced bars united forward of the wheel on a conical hub and extending backward and upward and united to the cutting-rim of the wheel, whereby a portion of the potatoes and vines can be freely discharged through the wheel and vines prevented from wrapping around the shaft; sixth, to provide both a concave digging-wheel having a continuous cutting-edge and a concave rotary conveyer separator-wheel for combined operation in a potato-digging machine; seventh, to provide means for adjusting the shaft of the digging-wheel either laterally or vertically; eighth, to provide a double-boxed bearing for the driving-shaft of the separator and the shaft carrying the separator; ninth, to provide a guard-rod in front of the right-hand plow-standard for preventing vines wrapping around said standard; tenth, to provide means for adjusting the supporting-sole of the left-hand plow for deeper or shallower plowing, and at the same time to regulate the altitude of the digging and separating wheels; eleventh, to provide means for operating the independently-driven conveyer separator-wheel at a greater speed than that at which the independently-driven digging-wheel is operated.

Figure 2:
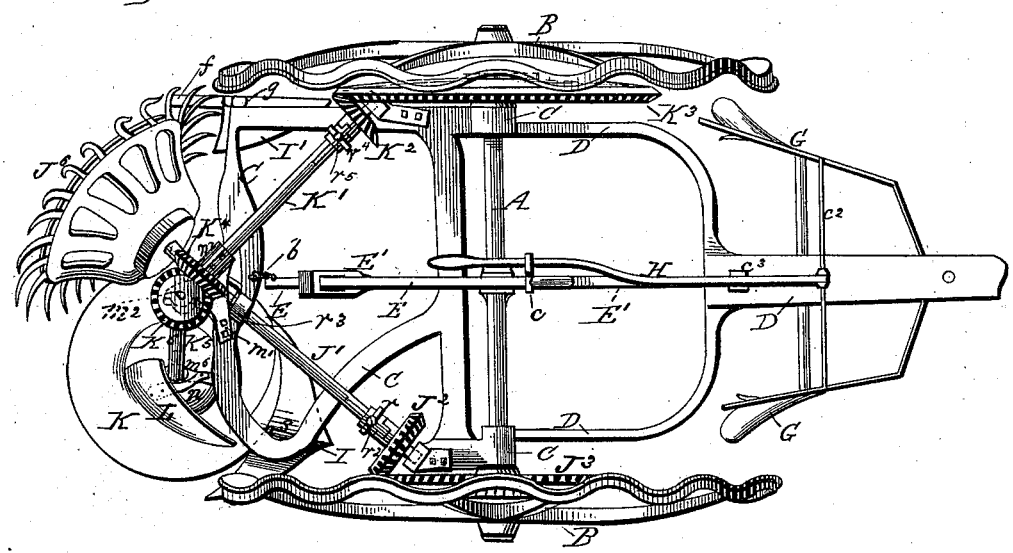
Figure 3:
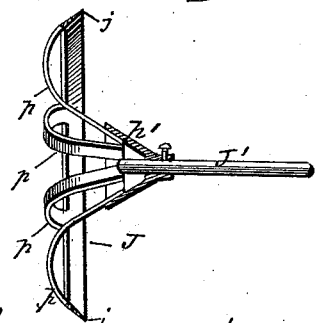
Figure 4:
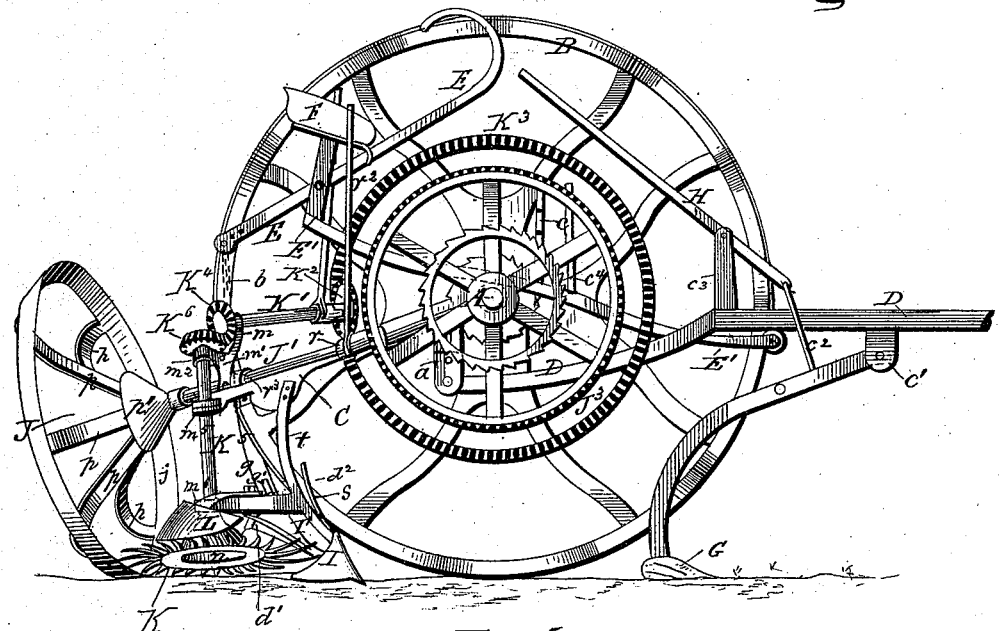
Figure 5:
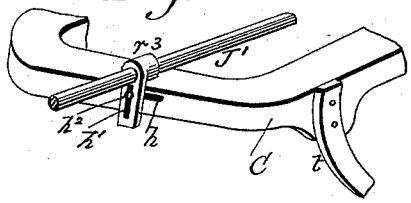
Figure 8:
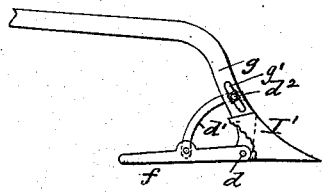
Figure 7:
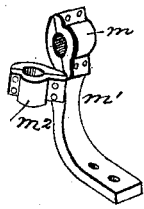
Figure 6:
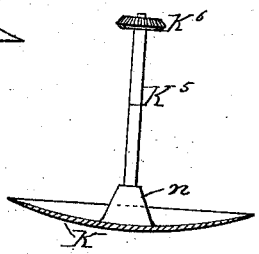

In the accompanying drawings, Figure 1 is a perspective view of my improved digging-machine, the concave tined conveyer separator being shown as adjusted for use with a tined digging-wheel such as is shown in my pending application, filed February 3, 1881, Serial No. 25,367, which digging-wheel is here shown on an independent shaft geared to the axle and driven by a gear of said axle through one or both of the ratchet-connected traction-wheels, and the conveyer-separator is shown on an independent shaft geared to said axle and driven by a gear of said axle through one or both of the traction-wheels, the machine in respect to its plow and gear supporting frame, adjustable hangers for draft-pole or tongue, axle, ratchet-connected traction-wheels, balancing, lifting, and adjusting levers, right-hand double-mold-board plow, left-hand single-mold-board plow, vine-gathering hooks, and driver's seat being very similar to the machine represented in my aforesaid pending application, and the main points of difference, as seen in this view, being the arrangement and construction of the bearings for the crossed shafts of the digging and separating wheels and the inclined carrying and driving shaft of the separator-wheel and the arrangement of the said shafts, and in means for adjusting the supporting-sole of the left-hand plow and the concaved form of the tined conveyer separator-wheel. Fig. 2 is a top view of the same, showing a concavo-convex solid conveyer-separator substituted for that shown in Fig. 1. Fig. 3 is a detail sectional view of a continuous edged flaring digging-wheel with curved arms united on a conical hub. Fig. 4 is a side elevation of a digging-machine, the right-hand traction-wheel being removed. In this view the continous edged digging-wheel is substituted for the tined digging-wheel shown in Figs. 1 and 2, and a concave tined conveyer separator-wheel is substituted for the solid conveyer-separator shown in Fig. 2. Fig. 5 is a perspective view of a rear portion of the frame and a portion of the digging-wheel shaft and right-handed plow standard and bracket, illustrating the means for adjusting said shaft either laterally and vertically, or in both directions. Fig. 6 is a perspective view of the double bearing-box for the driving-shaft of the separator and separator-shaft. Fig. 7 is a vertical sectional view of the separator in connection with its shaft and a gear-wheel, and Fig. 8 is a detail longitudinal section of the left-hand plow and means for adjusting its sole for changing the depth of plowing and regulating the altitude of the digging and separating wheels.

A in the drawings represents the revolving axle; B B, supporting traction-wheels of the serpentined and flanged construction shown, or of any other suitable construction, and confined by ratchets and pawls, as usual, to the axle, so as to become fast and loose, as occasion requires; C, a frame hinged to the axle so as to vibrate up and down in rear of the same.

D is the bifurcated pole or tongue, hinged to the pendent vertically-adjustable portions of hangers $a\ a$ of the frame; and E E' is a compound lever. Part E of this lever is fulcrumed on the axle, and its rear end carries the driver's seat F, while its forward end extends forward under the rear end of the pole or tongue and bears, by means of the friction-roller, against the same, and the part E' is pivoted to part E, and is connected by a chain or bail $b$ to the rear bar of the hinged frame. This compound lever is, as usual, furnished with a latching-standard $c$, its purpose being the same as in my aforesaid pending application, and need not be further described here.

G G' are vine-gatherers connected and pivoted to a hanger $c'$ of the tongue. These draw in and throw the vines upon the sides and center of the potato-row, and they are connected by a bail $c^2$ to a lifting-lever H, said lever being pivoted to a standard $c^3$ of the pole or tongue and provided with a latching-bar $c^4$, as usual. By means of the lever H the vine-gatherers can be raised whenever it is necessary to turn the machine around or pass over obstructions. These vine-gatherers, with the exception of having small shovels, are substantially the same in construction and operation as those in my aforesaid pending application.

I I' are plows attached to the rear of the hinged frame. The plow I is constructed with a double and the plow I' with a single mold-board. The single-mold-board plow has its location near the left rear corner, and the double-mold-board plow near the right rear corner of said frame, as shown. The sole-plate $f$ of the plow I' is pivoted at $d$ and connected by a curved bar $d'$ and a bolt $d^2$ to the slotted standard $g$ of said plow, and by sliding the bolt in the slot $g'$ of the standard the sole-plate $f$ can have its heel end depressed or elevated, and thereby the plow-point caused to enter to a less or greater depth in the ground. This adjustment also changes the altitude of the rear end of the hinged frame, and thereby changes the depth of the digging performed either by the digging-wheel J or $J^6$, and insures the relative proper positions of the tines or edges of the conveyer or separator wheel H to the entering edge of said digging-wheel. After the sole-plate has been adjusted it is confined by the bolt $d^2$, which is provided with a nut, as usual. The shaft J' of the digging-wheel J or $J^6$ is set inclining downwardly, and also diagonally, in suitable boxes upon the frame C, and is provided near its forward end with a loose bevel-gear $J^2$, which is provided with a clutch $r$ and clutch-lever $r^2$ and gears into a bevel-wheel $j^3$ made fast on the axle A, and having one of the aforementioned ratchet-wheels cast on its back, into which ratchet-wheel a pawl attached to a traction-wheel B drops when the machine is moving forward and sets the gearing and shaft revolving. The box $r^3$, in which the rear end of the shaft J' is fitted, has lateral and vertical movements on the rear bar of the hinged frame C by means of a transverse slot $h$ in said bar and a vertical slot $h'$ in a bracket of the box $r^3$, the box being clamped to the said bar by a bolt $h^2$, which is slackened and tightened to make the aforesaid adjustments of the shaft. By this adjustable box $r^3$ the shaft J' of the digging-wheel J or $J^6$ can be set more or less diagonal and more or less inclined, and thus the relation of gear-wheels to one another and the edge of the digging-wheel J' or ends of the tines of the digging-wheel $J^6$ to the ground or to the standards of the plow I' can be very nicely maintained or adjusted. The driving-shaft K' of the conveyer separator-wheel K is also set incliningly and diagonally in suitable boxes of the frame C, and has its rear end set in one box $m$ of a double-boxed bracket $m'$ of the frame C, and near its front end a bevel-wheel $K^2$ is provided, said wheel meshing with a correspondingly-beveled gear $K^3$ of larger diameter than the bevel-gear $J^3$. The gear $K^3$ is also fast on the axle, and has one of the before-mentioned ratchets cast on its back, into which ratchet a pawl attached to a traction-supporting wheel drops when the machine moves forward, and thereby sets the axle, gearing, and shaft K' revolving. The diameter of the gear-wheel $K^3$ being greater than the gear-wheel $J^3$, an increased speed is given to the shaft of the conveyer separator-wheel, and thus a more violent action for separating purposes is given to the said separator. The gear $K^2$ slides and is provided with a clutch $r^4$ and clutch-lever $r^5$, whereby it can be thrown in and out of gear with gear $K^3$. On the rear end of the shaft $K^3$ a bevel-wheel $K^4$ is fastened. The shaft proper $K^5$ of the conveyer separator-wheel is set with an inclination from its top backward and sidewise, and at its upper end is fitted in the other box $m^2$ of the bracket $m'$, while its lower portion is fitted in suitable boxes or bearings $m^5$ $m^6$, as shown. At the upper end of the draft of the conveyer separator-wheel a bevel-wheel $K^6$ is applied, and made to gear with the gear $K^4$. The conveyer separator-wheel K is fastened on the lower end of the shaft $K^5$, and it is formed of either a concavo-convex disk having a conical hub $n$, as shown in Fig. 7, or of concave tines inserted into the hub. The position of the conveyer separator-wheel K is immediately behind the double-mold-board plow I, and it is shielded against stones on the right hand and against vines and clods on the left hand by the mold-boards of said plow, said substances being turned aside, right and left, out of the track of the said separator. The described inclination backward and sidewise of the shaft $K^5$ gives the conveyor separator-wheel K an inclination downward and forward from right to left with respect to the horizon, so that its cutting-edge or tine-points are caused to touch about the base of the furrow formed by the double-mold-board plow I, which is about on a plane with or a little above the edge or points of the tines of the digging-wheel J or $J^6$, when down at about the bottom of the row of potatoes. The relative inclined and lateral position of the conveyer separator-wheel K to the digging-wheel J or $J^6$ is such that the separator forms, with the rim or tines of the digging-wheel, a sufficiently continuous conveying-support for holding the major portion of the dug potatoes and adhering vines and earth during the conveyance of the same to the discharging side of the machine, and that portion of the support formed by the conveyer separator-wheel being revolved rapidly and inclined concavo-convex, and either solid or tined, the potatoes, vines, and earth are subjected to a violent agitation, and a very effectual separation of the potatoes from the vines and earth is accomplished, while at the same time the potatoes are carried laterally toward the right side of the machine. Near the bottom of the shaft K, and partly around and over the conical hub $n$ of the conveyer separator-wheel K, a curved inclined shield L is suitably placed and fastened to the plow-standard $t$ or hinged frame C, so as to stand nearly transversely upon the conveyer separator-wheel K, with its under edge, which is shaped to the concave surface of the same, fitting close thereto, as shown. By this shield L the separated potatoes, vines, and earth are directed and caused to glide off at the periphery of the conveyer separator-wheel K upon the surface of the ground, and prevented from passing around to the front of the shaft of the said separator-wheel K and winding upon said shaft.

On the plow I in front of its standard $t$ an inclined or upright rod $s$ is applied for preventing vines collecting upon said standard. The digging-wheel J or $J^6$, by reason of the inclination and diagonal arrangement of its shaft $J'$, has an inclination to the left side of the machine from the lowest to the highest points of its circumference, both backward and sidewise, and thus its periphery is thrown in proper relation to the standard $g$ of the plow I' for clearing, in its rotation, vines and trash from said standard. This wheel, as shown in Fig. 4, is preferably formed with an outwardly and forwardly flared continuous circular rim $j$, said rim being attached to widely-spaced radial arms $p$, which extend on a segmental curve downward and backward, (being concavo-convex,) and then on an incline downward and forward, all uniting upon and fastening to a conical or analogous inclined surfaced hub $p'$, as shown in Figs. 3 and 4. By this construction and arrangement of the digging-wheel J the vines are cut through and the earth is entered with a shearing cut to a depth of or a little below the potatoes in the row, and the potatoes, vines, and earth lifted and thrown upon the conveyer separator-wheel K, and such potatoes, vines, and earth or stones as are carried up by the wheel are conducted by the inclined surfaced hub $p'$ and curved arms $p$ of the wheel J to the back of said wheel and caused to pass out through the large spaces between said arms and fall upon the ground behind the wheel. The shafts $J'$ $K'$ of the digging and separating wheels J and K, together with the inclined and diagonal shafts, are so arranged in their bearing-boxes that they can cross each other in reversely-diagonal directions, said bearing-boxes being cast on or attached to the frame so as to admit of the said arrangement of the shafts. The gear-wheels on the axle and the traction-wheels may be dished so as to accommodate the forward bearing-boxes, as shown; but this is not essential, for by making the axle longer there would be sufficient space for the accommodation of the diagonal shafts and their boxes if the said gear-wheels and traction-wheels were made with perpendicular arms, or if the traction-wheel arms were set with an inward instead of an outward inclination from the rims of said traction-wheels.

It is obvious that for use in connection with my independent diagonal shafts and the conveyer separator-wheel a tined digging-wheel $J^6$, constructed and operated precisely like the one shown and described in my aforesaid pending case, can be substituted, as illustrated in Figs. 1 and 2 of the drawings, for the wheel with continuous edge, as shown in Figs. 3 and 4; also, that for use in connection with my independent diagonal shafts $J'$ $K'$ and digging-wheel J or $J^6$ a concave tined conveyer separator-wheel K, as shown in Figs. 1 and 4, can be substituted for the solid concave conveyer separator-wheel K, (shown in Figs. 2 and 7,) said tined separator-wheel having its tines curved and diverging in reverse direction to their rotation, the same as in my aforesaid pending application.

As a modification of the gearing for operating the shaft $K^5$ of the separator-wheel, I propose to substitute an ordinary knuckle-joint driving-connection for the bevel-wheels $k^4 k^6$.

In operating with my machine the potato-row is straddled and the machine drawn forward, and as it moves the vines are gathered and turned inward upon the center of the row, and simultaneously the plows enter the earth to a suitable depth, preferably below the potatoes, on each side of the row, and while the plowing is proceeding the traction-wheels keep the axle and its gear and the gearing and shafts of the digging-wheel and conveyer separator-wheel in motion, and the power is thus transmitted from the axle and its gear-wheels and the traction-wheels to the digging and separator wheels, and the successive portions of the edge of the digging-wheel J, if that is in use, are caused to penetrate the earth with a shearing cut oblique to the line of draft to a depth preferably below the potatoes, and to lift the potatoes and vines and adhering earth to the surface. As soon as the rim of the wheel has thus collected the potatoes, vines, and earth it throws the same laterally and divergently upon the concave conveyer separator-wheel, whereupon the whole is violently agitated and separated and carried off in nearly the same direction, they being prevented from passing around forward of the separator-wheel by the inclined transverse directing-shield, and by said shield, in conjunction with the motion of the separator, are thrown off upon the surface of the ground at the right side of the machine. If during the operation vines collect on the standard of the plow I', the flaring rim of said wheel cuts or carries them away to the right-hand side of the machine, and if stones and stumps come in the way of the plows and digging and separator wheels the driver swings the frame C and the attached parts up out of the way of the same by means of the part E of the compound lever E E'. The vine-gatherers are also raised out of the way by the hand-lever H, the said adjustments being also made when it is necessary to turn the machine around. By means of the clutches and their levers the digging and separating wheels can be thrown out of gear whenever desired.

What I claim is—

1. In a potato-digging machine, in combination, the axle A, ratchet-connected traction-wheels B B, frame C, gears $K^3 J^3$, fixed on the axle, diagonal shafts J' K', gears $J^2 K^2$ on said shafts, a rotary conveyer separator-wheel, shaft $K^5$, carrying said separator-wheel, and a gear $K^6$ on the upper end of said shaft, substantially as described.

2. In a potato-digging machine, in combination, the concavo-convex conveyer separator-wheel set inclined to the horizon, an inclined shaft, a hinged frame, a diagonal shaft, gears on axle, and the traction-wheels, substantially as described.

3. In a potato-digging machine, in combination, the concavo-convex conveyer separator-wheel K and the transverse directing and discharging shield L, conforming on its under side with the concave form of the separator, substantially as described.

4. In a potato-digging machine, in combination, the concave outwardly and forwardly flared continuous-edged digging-wheel J, diagonal and inclined shaft J', hinged frame C, gears $J^2 J^3$ for operating said wheel, the axle A, and supporting ratchet-connected traction-wheels B B, substantially as and for the purpose described.

5. In a potato-digging machine, the concave outwardly and forwardly flared continuous-edged digging-wheel J, having spaced arms $p$, which are united forward of the wheel upon a conical hub and extended backward on segmentally curved and inclined lines upward and forward and united to the cutting-rim $j$ of the wheel, the diagonal shaft J' for producing a rotary shearing cut with said wheel, gears $J^3 J^2$ for operating said shaft, a hinged frame C, an axle A, and ratchet-connected traction-supporting wheels, substantially as and for the purpose described.

6. In a potato-digger, in combination, a rotary concave conveyer separator-wheel and a continuous-edged rotary digger-wheel, each of said wheels being driven by an independent diagonal shaft, one of said shafts crossing the other, substantially as and for the purpose described.

7. In a potato-digger, in combination, the digging-wheel, inclined diagonal shaft J', hinged frame C, and adjustable bearing-box $r^3$, substantially as and for the purpose described.

8. In a potato-digger, in combination, the double bearing-box bracket $m'$, hinged frame C, diagonal shaft K', and inclined shaft $K^5$, carrying the conveyer separator-wheel K, substantially as and for the purpose described.

9. In a potato-digging machine, in combination, the double mold-board I, provided with an upright rod $s$ forward of its standard, a hinged frame C, and a revolving conveyer separator-wheel K in rear of the plow, substantially as described.

10. In a potato-digger, in combination, a hinged frame C, a left-hand plow I', having a pivoted sole-plate $f$, means for raising, lowering, and holding the heel of said sole-plate, a digging-wheel, a conveyer separator-wheel, and a right-hand plow I, substantially as and for the purpose described.

11. In a potato-digger, in combination, a digging-wheel, the conveyer separator-wheel, diagonal driving-shafts, a vertical inclined shaft, and gears which give the conveyer, separator, and the digging-wheel different speeds, substantially as described.

In testimony whereof I hereunto affix my signature in presence of two witnesses.

ELIAS T. FORD.

Witnesses:
JOHN PATRICK,
E. H. PATRICK.